United States Patent
Huang

(10) Patent No.: US 10,282,037 B1
(45) Date of Patent: May 7, 2019

(54) ADJUSTING METHOD OF A VIRTUAL KEYBOARD AND TOUCH DEVICE

(71) Applicants: Inventec (Pudong) Technology Corporation, Shanghai (CN); INVENTEC CORPORATION, Taipei (TW)

(72) Inventor: Chen-Chou Huang, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 15/853,842

(22) Filed: Dec. 24, 2017

(30) Foreign Application Priority Data

Nov. 10, 2017 (CN) .......................... 2017 1 1103796

(51) Int. Cl.
G09G 1/00 (2006.01)
G06F 3/042 (2006.01)
G06F 3/0488 (2013.01)
G06F 3/041 (2006.01)

(52) U.S. Cl.
CPC .......... *G06F 3/0426* (2013.01); *G06F 3/0412* (2013.01); *G06F 3/0488* (2013.01)

(58) Field of Classification Search
CPC ...... G06F 1/00; G06F 3/04883; G06F 3/0237; G06F 3/044; G06F 3/041
See application file for complete search history.

(56) References Cited

U.S. PATENT DOCUMENTS

2016/0274788 A1* 9/2016 Li ....................... G06F 3/04886

FOREIGN PATENT DOCUMENTS

| CN | 1759369 A | 4/2006 |
| CN | 102778992 A | 11/2012 |
| TW | 201222396 A | 6/2012 |
| TW | 201530415 A | 8/2015 |

* cited by examiner

*Primary Examiner* — Michael A Faragalla
(74) *Attorney, Agent, or Firm* — CKC & Partners Co., LLC

(57) ABSTRACT

An adjusting method of a virtual keyboard adapted to a first touch device is disclosed. The first touch device displays a virtual keyboard with several keys. The adjusting method includes the following operations: adjusting a position and a size of the virtual keyboard displayed on the first touch device according to an operating range of a user; collecting several first click points on the virtual keyboard and one of the keys corresponding to the first click points; analyzing several press distributions of the keys according to the first click points; determining one of the keys corresponding to a second click point according to the press distributions and center points of the keys; transmitting the press distributions and the position and the size of the virtual keyboard to a server; and transmitting the press distributions and the position and the size of the virtual keyboard to a second touch device.

8 Claims, 4 Drawing Sheets

ADJUSTING METHOD OF A VIRTUAL KEYBOARD AND TOUCH DEVICE

CROSS-REFERENCE TO RELATED APPLICATION

This application claims priority to China Application Serial Number 201711103796.3, filed Nov. 10, 2017, which is herein incorporated by reference.

FIELD OF INVENTION

The invention relates to an adjusting method of a virtual keyboard and a touch device. More particularly, the invention relates to an adjusting method of a virtual keyboard and a touch device for adjusting click operations.

BACKGROUND

At present, a touch device (for example, touch phone) has become a popular portable device. In the case of a non-physical keyboard, a built-in virtual keyboard is usually used for typing, and the size of the virtual keyboard may vary depending on the size of the screen of the device. In the case of the need for one-handed operation, the users need to compromise the size of the virtual keyboard of the device. The users need to re-adapt to the size of the virtual keyboard of the device, and the problem of wrong typing often occurs.

Therefore, How to more effectively identify and correct the user's click operation on the virtual keyboard and reduce the time for the user to adapt to different touch devices, are problems that are needed to be addressed in the art.

SUMMARY

An embodiment of this disclosure is to provide an adjusting method of a virtual keyboard. The adjusting method is adapted to a first touch device. The first touch device displays a virtual keyboard, and the virtual keyboard includes several keys. The adjusting method includes the following operations: adjusting a position and a size of the virtual keyboard displayed on the first touch device according to an operating range of a user; collecting several first click points of several first click operations of the user on the virtual keyboard and one of the keys corresponding to the first click points; analyzing several press distributions of the keys according to the first click points; and determining one of the keys corresponding to a second click point of a second click operation of the user according to the press distributions and several center points of the keys; transmitting the press distributions and the position and the size of the virtual keyboard to a server; and transmitting the press distributions and the position and the size of the virtual keyboard to a second touch device.

An embodiment of this disclosure is to provide a touch device. The touch device displays a virtual keyboard, and the virtual keyboard includes several keys. The touch device includes a sensor, a processor, and a communication interface. The sensor is configured for sensing an operating range of a user and sensing several first click points of several first click operations of the user on the virtual keyboard. The processor is configured for adjusting a position and a size of the virtual keyboard displayed on the touch device according to the operating range, collecting the first click points and one of the keys corresponding to each of the first click points, and analyzing several press distributions of the keys according to the first click points, and the processor is further configured for determining one of the keys corresponding to a second click point of a second click operation of the user according to the press distributions and several center points of the keys. The communication interface is configured for transmitting the press distributions and the position and the size of the virtual keyboard to a server.

Therefore, according to the technical concept of the present invention, embodiments of the present disclosure provide an adjusting method of a virtual keyboard and a touch device. More particularly, the invention relates to an adjusting method of a virtual keyboard and a touch device for adjusting click operations for adjusting a click operation, so as to more effectively identify and correct the click operations on a virtual keyboard of the users, and simultaneously update multiple touch devices through the cloud server to reduce the time for the user to adapt to different touch devices.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
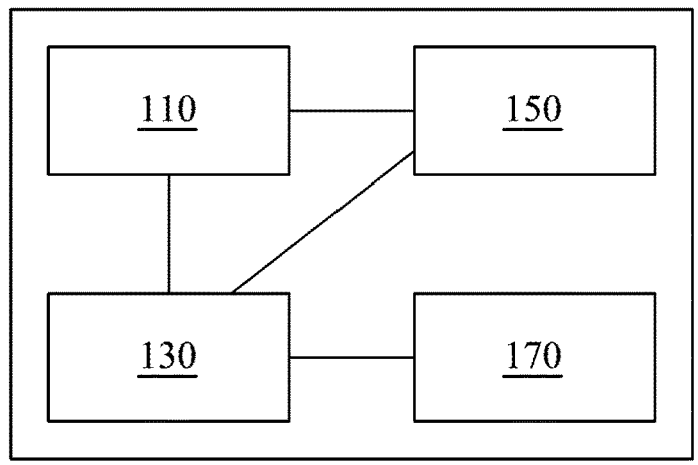
FIG. 1 is a schematic diagram illustrating a touch device according to some embodiments of the present disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

Reference is made to FIG. 1. FIG. 1 is a schematic diagram illustrating a touch device 100 according to some embodiments of the present disclosure. The touch device 100 includes a sensor 110 and a processor 130. The processor 130 is coupled to the sensor 110. The touch device 100 displays a virtual keyboard 150. In some embodiments, the virtual keyboard 150 is electrically coupled to the processor 130 and the sensor 110, respectively.

Figure 2:
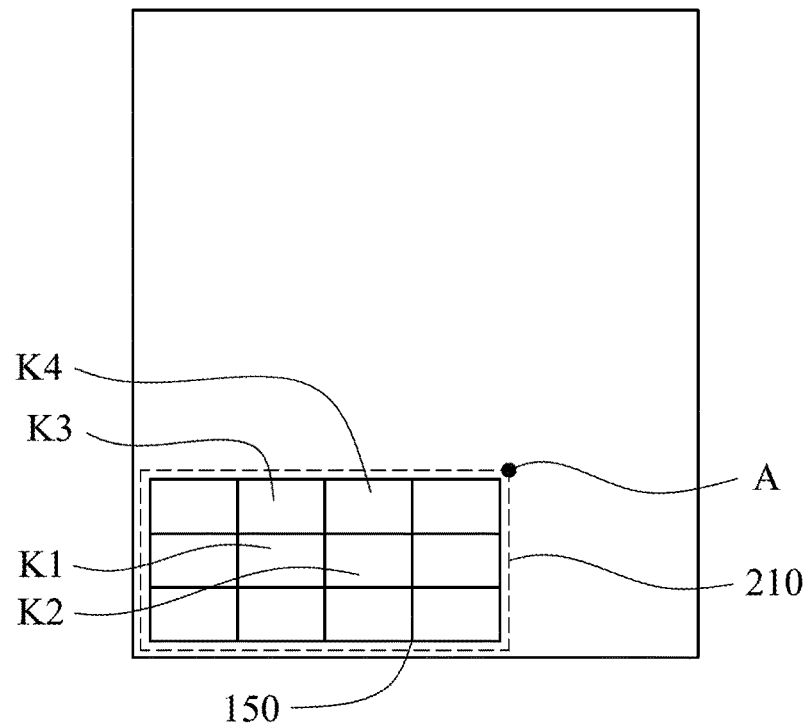
FIG. 2 is a schematic diagram illustrating a touch device according to some embodiments of the present disclosure.

FIG. 2 is a schematic diagram illustrating a touch device 100 according to some embodiments of the present disclosure. Reference is made to FIG. 1 and FIG. 2. The virtual keyboard 150 includes several keys K1-K4.

The sensor 110 senses the user's operating range 210, and the processor 130 adjusts a position and a size of the virtual keyboard 150 displayed on the touch device 100 according to the operating range 210.

In some embodiments, the processor 130 is further configured for setting a size of the virtual keyboard 150 according to a user's initial click operation. For example, reference is made to FIG. 2. If the click point of the user's initial click operation is the click point A, the processor 130 sets the size of the virtual keyboard 150 to be within the operating range 210 of the click point A and the lower left corner of the touch device 100.

Figure 3:
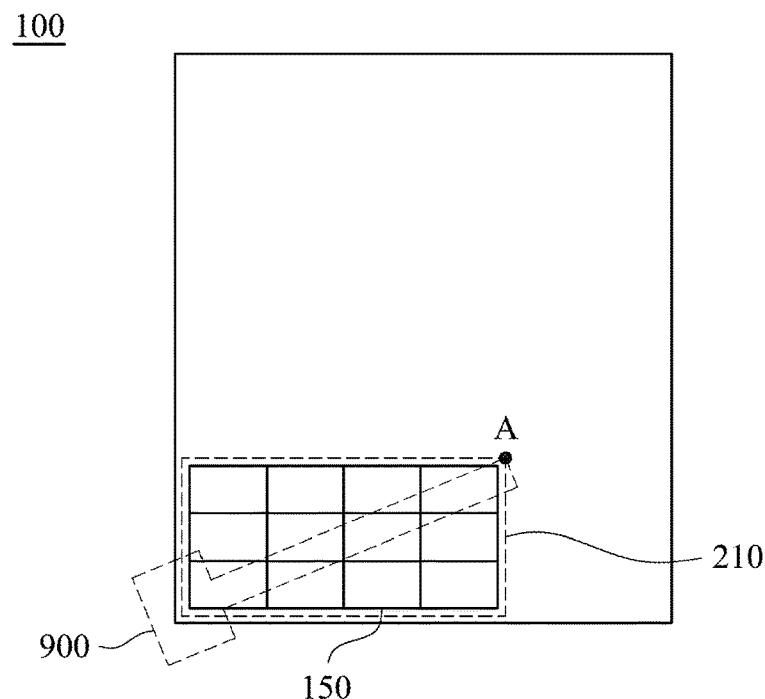
FIG. 3 is a schematic diagram illustrating a touch device according to some embodiments of the present disclosure.

FIG. 3 is a schematic diagram illustrating a touch device 100 according to some embodiments of the present disclosure. Reference is made to FIG. 3. In some embodiments, the processor 130 is further configured for setting a position of the virtual keyboard 150 according to a user's initial click operation. For example, if during the initial click operation, the left hand 900 of the user grasps the touch device 100 from the left side of the touch device 100 to perform a click operation. In the case that the user holds the touch device 100, the farthest clickable point that the user may click is the click point A. The processor 130 sets the size of the virtual keyboard 150 to be within the operating range 210 of the click point A and the lower left corner of the touch device 100.

Reference is made to FIG. 1 and FIG. 3. The sensor 110 senses several click points of several click operations performed by the user on the virtual keyboard 150. The processor 130 collects several click points and keys respectively corresponding to the click points, and analyzes the press distributions of the keys respectively according to the click points.

Figure 4:
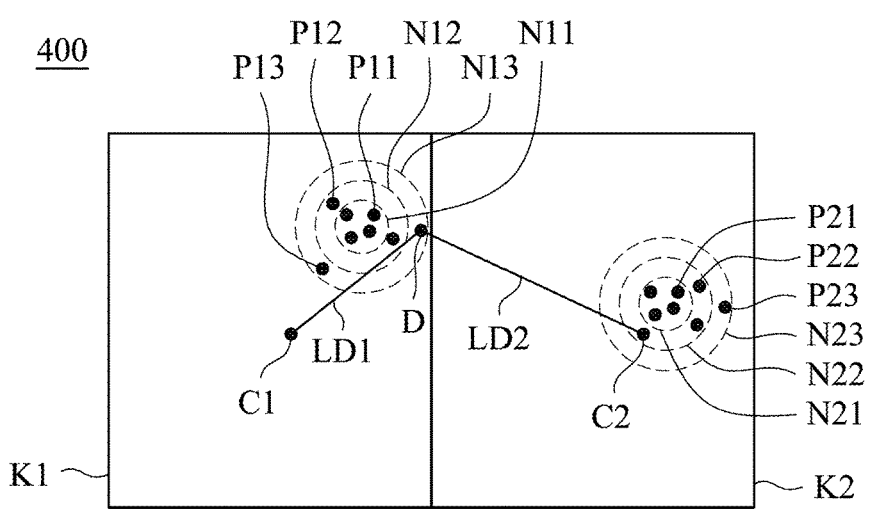
FIG. 4 is a schematic diagram illustrating a portion of a touch device according to some embodiments of the present disclosure.

FIG. 4 is a schematic diagram illustrating a portion of a touch device 400 of the touch device 150 according to some embodiments of the present disclosure. For convenience of explanation and understanding, FIG. 4 only shows a portion of the virtual keyboard 150. For example, reference is made to FIG. 4. In some embodiments, the click points P11-P13 correspond to the keyboard K1. The processor 130 collects the click points P11-P13 corresponding to the keyboard K1 and analyzes the press distributions N11-N13 of the keyboard K1. In some embodiments, the press distributions N11-N13 are concentric circles. The press distribution N11 is the concentric circle of the innermost circle, the press distribution N12 is a concentric circle including the range of the press distribution N11, and the press distribution N13 is a concentric circle including the range of the press distribution N11 and the press distribution N12 s.

In some embodiments, the press distribution is a normal distribution. For example, 68.26% of the click points P11-P13 corresponding to the keyboard K1 is located within the range of the press distribution N11. 95.44% of the click points P11-P13 corresponding to the keyboard K1 is located within the range of the press distribution N12. 99.72% of the click points P11-P13 corresponding to the keyboard K1 is located within the range of the press distribution N13.

Similarly, the click points P21-P23 correspond to the keyboard K2. The processor 130 collects the click points P21-P23 corresponding to the keyboard K2 and analyzes the press distribution N21-N23 of the keyboard K2. In some embodiments, the press distribution is a normal distribution. For example, 68.26% of the click points P21-P23 corresponding to the keyboard K2 is located in the range of the press distribution N21. 95.44% of the click points P21-P23 corresponding to the keyboard K2 is located within the range of the press distribution N22. 99.72% of the click points P21-P23 corresponding to the keyboard K2 is located within the range of the press distribution N23.

The press distribution and the ratio mentioning above are only for illustrative purposes, and the present disclosure is not limited thereto.

The processor 130 determines, according to the press distribution and the center points of the keys, the key corresponding to the click point of the click operation of the user.

In some embodiments, the processor 130 is further configured for calculating the distances of the click point relative to the central points of the keys respectively, and determining that the smallest of the distances is the key corresponding to the click point.

Figure 5:
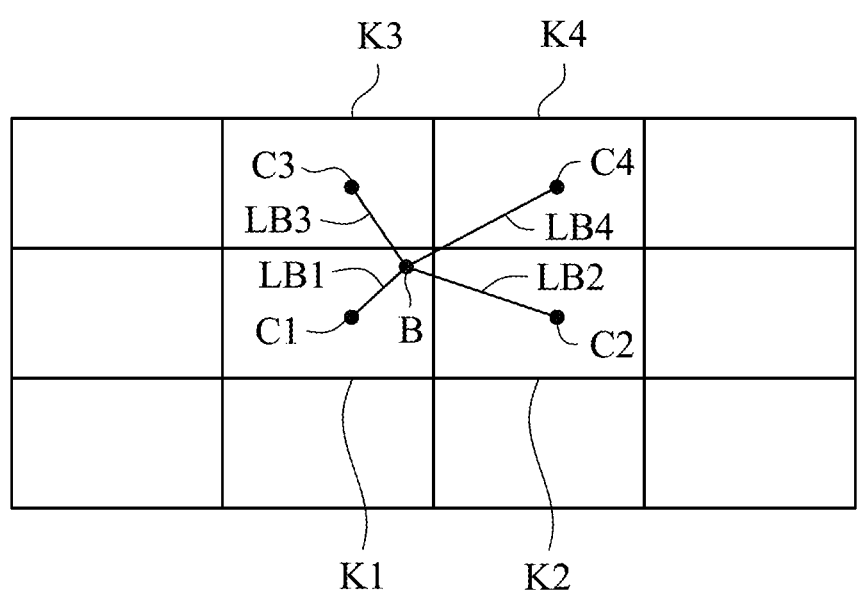
FIG. 5 is a schematic diagram illustrating a virtual keyboard according to some embodiments of the present disclosure.

For example, reference is made to FIG. 5. FIG. 5 is a schematic diagram illustrating a virtual keyboard 150 according to some embodiments of the present disclosure. The virtual keyboard 150 includes keys K1-K4. The center of the key K1 is the center point C1. The center of the key K2 is the center point C2. The center of the key K3 is the center point C3. The center of the key K4 is the center point C4. When the sensor 110 detects the click point B of the user's click operation on the virtual keyboard 150, the processor 130 calculates the distance LB1 of the click point B relative to the center point C1 of the key K1, calculates the distance LB2 of the click point B relative to the center point C2 of the key K2, calculates the distance LB3 of the click point B relative to the center point C3 of the key K3, and calculates the distance LB4 of the click point B relative to the center point C4 of the key K4.

The processor 130 determines that the distance LB1 between the click point B and the center point C1 of the key K1 is the smallest of the distances LB1 to LB4. Therefore, the processor 130 determines that the key corresponding to the click point B is the key K1.

In some embodiments, when the difference between the two of the distances is less than a difference threshold, the key corresponding to the click point is determined according to the press distributions.

For example, reference is made to FIG. 4. When the sensor 110 senses the click point D of the user's click operation on the virtual keyboard 150, the processor 130 calculates the distance LD1 of the click point D relative to the central point C1 of the key K1, and calculates the distance LD2 of the click point D relative to the central point C2 of the key K2.

If the difference between the distance LD1 and the distance LD2 is less than the difference threshold, it indicates that the position of the click point D is not very clear, possibly because the click point D is located near the interface between the key K1 and the key K2. When the difference between the distance LD1 and the distance LD2 is less than the difference threshold, the processor 130 determines the key corresponding to the click point D according to the press distribution N11-N13 of the key K1 and the press distribution N21-N23 of the key K2.

As shown in FIG. 4, the click point D is located within the range of the press distribution N13 of the key K1, and the click point D is not located within the press distribution N21-N23 of the key K2. That is, clicking point D has a higher probability to be corresponding to key K1. Therefore, the processor 130 determines that the key K1 is a key corresponding to the click point D.

By adjusting the determination of the key corresponding to the click point using the press distribution as described above, the user's click operation on the virtual keyboard may be identified and corrected more effectively.

Reference is made to FIG. 1 again. In some embodiments, the touch device 100 further includes a communication interface 170. The communication interface 170 is configured for transmitting press distributions and the position and size of the virtual keyboard 150 to a server (not shown). When the user uses another touch device, another touch device may download the press distributions by the server and the position and size of the virtual keyboard 150. When the user uses another touch device, the other touch device may be adjusted to the position and size of the virtual keyboard used by the user, and the determination of the key corresponding to the click point is adjusted according to the usage habits of the user, so as to reduce the time that the users adapt to different touch devices.

Figure 6:
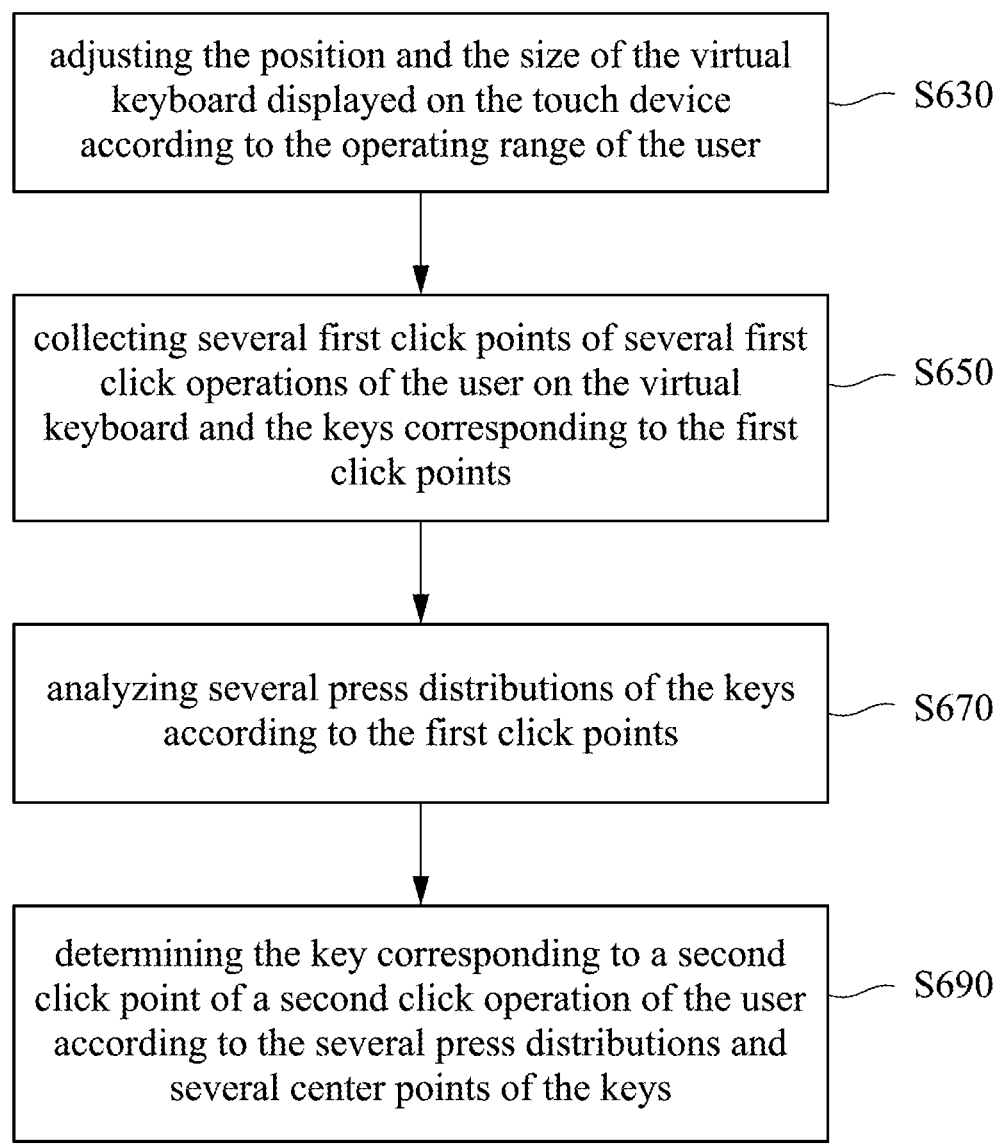
FIG. 6 is a flow chart illustrating an adjusting method according to some embodiments of the present disclosure.

Reference is made to FIG. 6. FIG. 6 is a flow chart illustrating an adjusting method 600 according to some embodiments of the present disclosure. As shown in FIG. 6, the adjusting method 600 includes the following operations:

Operation S630: adjusting the position and the size of the virtual keyboard displayed on the touch device according to the operating range of the user;

Operation S650: collecting several first click points of several first click operations of the user on the virtual keyboard and the keys corresponding to the first click points;

Operation S670: analyzing several press distributions of the keys according to the first click points; and Operation S690: determining the key corresponding to a second click point of a second click operation of the user according to the several press distributions and several center points of the keys.

In order to make the adjusting method 600 of the present disclosure easy to understand, reference is made to FIG. 1 to FIG. 6.

In operation S630, adjusting the position and the size of the virtual keyboard displayed on the touch device according to the operating range of the user. In some embodiments, operation S630 may be performed by the processor 130 in FIG. 1. For example, the processor 130 adjusts the position and the size of the virtual keyboard 150 displayed on the touch device 100 according to the operating range 210.

In some embodiments, operation S630 further includes setting a size of the virtual keyboard 150 according to a user's initial click operation. For example, reference is made to FIG. 2. If the click point of the user's initial click operation is the click point A, the processor 130 sets the size of the virtual keyboard 150 to be within the operating range 210 of the click point A and the lower left corner of the touch device 100.

In some embodiments, operation S630 further includes setting a position of the virtual keyboard 150 according to a user's initial click operation. Reference is made to FIG. 3. If during the initial click operation, the user's hand 900 performs a clicking operation by holding the touch device 100 from the left side of the touch device 100, and when the user holds the touch device 100, the farthest click point that the user may click is the click point A. The processor 130 sets the size of the virtual keyboard 150 to be within the operating range 210 of the click point A and the lower left corner of the touch device 100.

In operation S650, collecting several first click points of several first click operations of the user on the virtual keyboard and the keys corresponding to the first click points. In some embodiments, operation S650 may be performed by the processor 130 in FIG. 1. For example, the processor 130 collects the click points P11-P13 and the keyboard K1 corresponding to the click points P11-P13. The processor 130 collects the click points P21-P23 and the keyboard K2 corresponding to the click points P21-P23.

In operation S670, analyzing several press distributions of the keys according to the first click points. In some embodiments, operation S670 may be performed by the processor 130 in FIG. 1. For example, reference is made to FIG. 4. In some embodiments, the click points P11-P13 correspond to the keyboard K1. The processor 130 collects the click points P11-P13 corresponding to the keyboard K1 and analyzes the press distributions N11-N13 of the keyboard K1. In some embodiments, the press distribution is a normal distribution. For example, 68.26% of the click points P11-P13 corresponding to the keyboard K1 is located within the range of the press distribution N11. 95.44% of the click points P11-P13 corresponding to the keyboard K1 is located within the range of the press distribution N12, 99.72% of the click points P11-P13 corresponding to the keyboard K1 is within the range of the press distribution N13.

In operation S690, determining the key corresponding to a second click point of a second click operation of the user according to the several press distributions and several center points of the keys. In some embodiments, operation S690 may be performed by the processor 130 in FIG. 1.

In some embodiments, operation S690 further includes calculating respective distances of the click points relative to the center points of the keys, and determining that the smallest one of the distances is the key corresponding to the click point. For example, reference is made to FIG. 5. When the sensor 110 detects the click point B of the user's click operation on the virtual keyboard 150, the processor 130 calculates the distance LB1 of the click point B relative to the central point C1 of the key K1, calculates the distance LB2 of the click point B relative to the central point C2 of the key K2, calculates the distance LB3 of the click point B relative to the central point C3 of the key K3, and calculates the distance LB4 of the click point B relative to the central point C4 of the key K4.

The processor 130 determines that the distance LB1 of the click point B relative to the center point C1 of the key K1 is the smallest one of the distances LB1-LB4. Therefore, the processor 130 determines that the key corresponding to the click point B is the key K1.

In some embodiments, in operation S690, when the difference between the two of the distances is less than the difference threshold, the key corresponding to the click point is determined according to the press distributions.

For example, reference is made to FIG. 4. When the sensor 110 senses the click point D of the user's click operation on the virtual keyboard 150, the processor 130 calculates the distance LD1 of the click point D relative to the central point C1 of the key K1, and calculates the distance LD2 of the click point D relative to the central point C2 of the key K2.

If the difference between the distance LD1 and the distance LD2 is less than the difference threshold, it indicates that the position of the click point D is not very clear, possibly because the click point D is located near the boundary between the key K1 and the key K2. When the difference between the distance LD1 and the distance LD2 is less than the difference threshold, the processor 130 determines the key corresponding to the click point D according to the press distribution N11-N13 of the key K1 and the press distribution N21-N23 of the key K2.

As shown in FIG. 4, the click point D is located within the range of the press distribution N13 of the key K1, and the click point D is not located within the range of the press distribution N21-N23 of the key K2. That is, click point D has a higher probability to be corresponding to key K1. Therefore, the processor 130 determines that the key K1 is a key corresponding to the click point D.

In some embodiments, the adjusting method 600 further includes transmitting several press distributions and the position and size of the virtual keyboard 150 to a server (not shown), and the server will transmit the press distributions and the position and size of the virtual keyboard 150 to another touch device. When the user uses another touch device, another touch device may download the press distributions and the position and size of the virtual keyboard 150 from the server. When the user uses another touch device, the other touch device may adjust the position and the size of the virtual keyboard that the user accustomed to, and the other touch device may adjust the determination of the keys corresponding to the click points according to the user's usage habit.

In some embodiments of the present disclosure, the processor 130 may be a server, a circuit, a central processing unit, a central processing unit (CPU), a microprocessor (MCU), or other device having the function of storing, calculating, data reading, signal or information receiving, signal or information transmitting, or other equivalent functionality.

In some embodiments of the present disclosure, the sensor 110 may be a circuit having touch detection function or other devices or circuits with the equivalent function. In some embodiments of the present application, the communication interface 170 is configured for transmitting information and/or receiving information. The communication interface 170 may transmit information through a wired communication interface and/or a wireless communication interface.

Based on the aforementioned embodiments, embodiments of the present disclosure provide an adjusting method of a virtual keyboard and a touch device. More particularly, the invention relates to an adjusting method of a virtual keyboard and a touch device for adjusting click operations for adjusting a click operation, so as to more effectively identify and correct the click operations on a virtual keyboard of the users, and simultaneously update multiple touch devices through the cloud server to reduce the time for the user to adapt to different touch devices.

What is claimed is:

1. An adjusting method, wherein the adjusting method is adapted to a first touch device, wherein the first touch device displays a virtual keyboard, and the virtual keyboard comprises a plurality of keys, wherein the adjusting method comprises:
    adjusting a position and a size of the virtual keyboard displayed on the first touch device according to an operating range of a user;
    collecting a plurality of first click points of a plurality of first click operations of the user on the virtual keyboard and a first key of the keys corresponding to the first click points;
    analyzing a plurality of press distributions of the keys according to the first click points;
    determining a second key of the keys corresponding to a second click point of a second click operation of the user according to the press distributions and a plurality of center points of the keys;
    transmitting the press distributions and the position and the size of the virtual keyboard to a server; and
    transmitting the press distributions and the position and the size of the virtual keyboard to a second touch device.

2. The adjusting method of claim 1, wherein adjusting the position and the size of the virtual keyboard displayed on the first touch device according to the operating range of the user further comprises:
    setting the size and the position of the virtual keyboard according to an initial click operation of the user.

3. The adjusting method of claim 1, wherein determining the second key of the keys corresponding to a second click point of a second click operation of the user according to the press distributions and a plurality of center points of the keys further comprises:
    calculating a plurality of distances of the second click point relative to the center points of the keys; and
    determining a smallest one of the distances to be the second key of the keys corresponding to the second click point.

4. The adjusting method of claim 3, wherein determining the second key of the keys corresponding to the second click point of the second click operation of the user according to the press distributions and the center points of the keys further comprises:
    determining the second key of the keys corresponding to the second click point according to the press distributions when a difference between two of the distances is less than a difference threshold.

5. A touch device, wherein the touch device displays a virtual keyboard, and the virtual keyboard comprises a plurality of keys, wherein the touch device comprises:
    a sensor, configured for sensing an operating range of a user and sensing a plurality of first click points of a plurality of first click operations of the user on the virtual keyboard;
    a processor, configured for adjusting a position and a size of the virtual keyboard displayed on the touch device according to the operating range, collecting the first click points and a first key of the keys corresponding to each of the first click points, and analyzing a plurality of press distributions of the keys according to the first click points, and the processor is further configured for determining a second key of the keys corresponding to a second click point of a second click operation of the user according to the press distributions and a plurality of center points of the keys; and
    a communication circuitry, configured for transmitting the press distributions and the position and the size of the virtual keyboard to a server.

6. The touch device of claim 5, wherein the processor is further configured for setting the size and the position of the virtual keyboard according to an initial click operation of the user.

7. The touch device of claim 5, wherein the processor is further configured for calculating the plurality of distances of the second click point relative to the center points of the keys and determining a smallest one of the distances to be the second key of the keys corresponding to the second click point of the user.

8. The touch device of claim 5, wherein the processor is further configured for determining the second key of the keys corresponding to the second click point according to the press distributions when a difference between two of the distances is less than a difference threshold.

* * * * *